United States Patent [19]

Richards et al.

[11] Patent Number: 4,848,537

[45] Date of Patent: Jul. 18, 1989

[54] STORAGE CONVEYOR

[76] Inventors: Clive D. G. Richards, Lilac Cottage, Great Henny, Sudbury, Suffolk; Robert B. Zanoni, 57 Hawkwood Road, Sible Headingham, Essex both of United Kingdom

[21] Appl. No.: 240,404

[22] PCT Filed: Dec. 24, 1985

[86] PCT No.: PCT/GB85/00602

§ 371 Date: Sep. 10, 1986

§ 102(e) Date: Sep. 10, 1986

[87] PCT Pub. No.: WO86/04564

PCT Pub. Date: Aug. 14, 1986

Related U.S. Application Data

[63] Continuation of Ser. No. 906,233, Sep. 10, 1986, abandoned.

[30] Foreign Application Priority Data

Jan. 30, 1985 [GB] United Kingdom ................ 8502361
Nov. 20, 1985 [GB] United Kingdom ................ 8528578

[51] Int. Cl.⁴ ............................................. B65G 49/00
[52] U.S. Cl. ...................... 198/778; 414/331; 414/266; 414/222
[58] Field of Search ............... 414/786, 266, 331, 267, 414/222, 225, 226; 198/778

[56] References Cited

U.S. PATENT DOCUMENTS

| 3,128,875 | 4/1964 | Kay et al. ............. | 198/778 X |
| 3,517,836 | 6/1970 | Bosco .................... | 414/234 |
| 3,599,782 | 8/1971 | Whitfield ............. | 198/778 X |
| 4,201,288 | 5/1980 | van Capelleveen .. | 198/778 |
| 4,256,220 | 3/1981 | Lemmer ................ | 198/778 |
| 4,538,950 | 9/1985 | Shiomi et al. ........ | 414/392 X |
| 4,588,341 | 5/1986 | Motoda ................. | 414/331 X |
| 4,640,657 | 2/1987 | Moore et al. ......... | 414/620 X |

FOREIGN PATENT DOCUMENTS 2050982 1/1981 United Kingdom ................ 198/778

Primary Examiner—Frank E. Werner
Attorney, Agent, or Firm—Thomas E. Sisson

[57] ABSTRACT

A storage conveyer for workpieces is movable between selected locations to carry work pieces from one machine to another whilst maintaining the integrity of a batch. An endless chain is wound in a double helix configuration, each helix being supported on a respective driven shaft and an idler shaft. The chain carries pallets for supporting workpieces. The pallets are stepped through a loading location under the control of the manual worker and through a load/unload location where they are accessible to a robot machine, which may be given control of the chain drive. Location is at a lower position and extends out of the helical chain run to provide access for the robot machine.

7 Claims, 5 Drawing Sheets

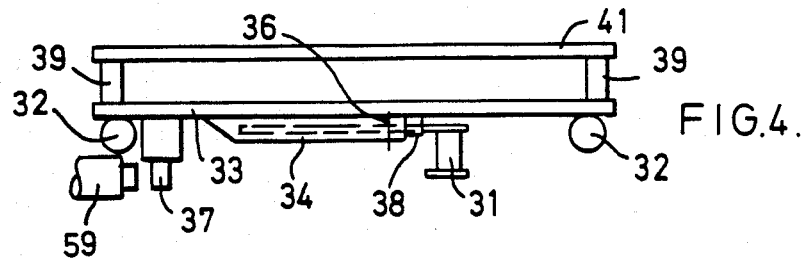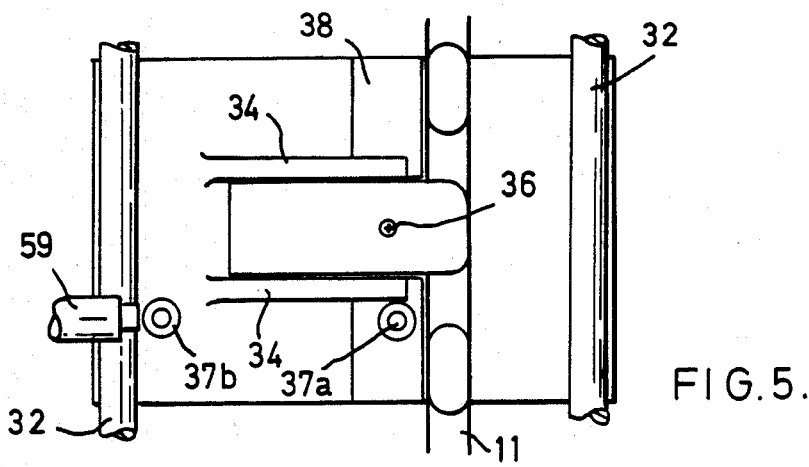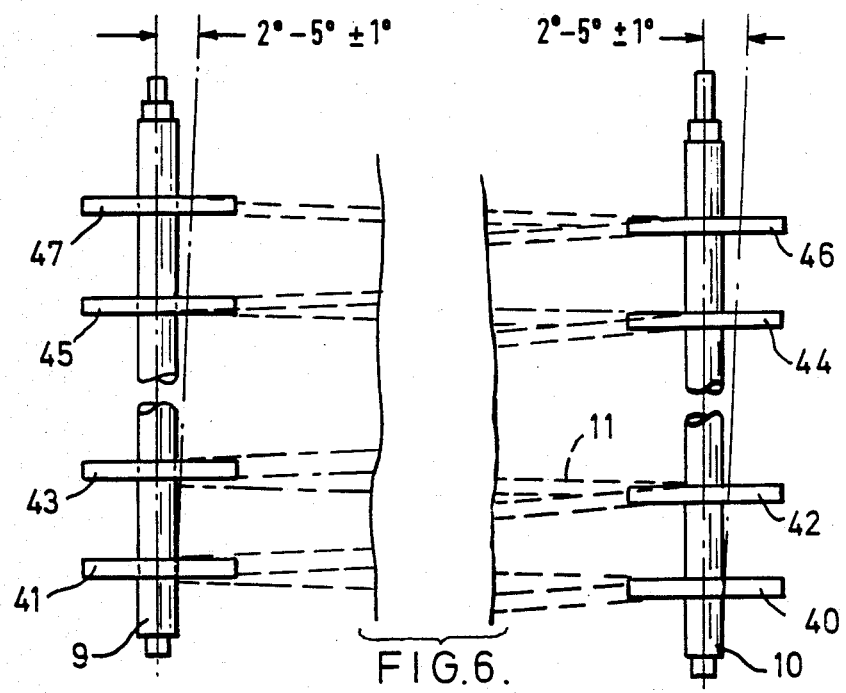

STORAGE CONVEYOR

This is a continuation of co-pending application Ser. No. 906,233, filed on Sept. 10, 1986, now abandoned.

This invention relates to transportable storage magazines in the form of conveyors, for workpieces, such as components, to be supplied seriatim to machines for manufacturing or other operations to be carried out automatically. Much effort has been put into automated or robotic operation of manufacturing stages, but the initial loading of the components or workpieces is still frequently carried out using indexing tables which have only limited capacity, e.g. between 20 and 50 items. Only in the case of very long production runs does the installation of purpose-built conveyors becomes economic.

DE-No. 2717586 discloses a storage conveyor comprising a continuous chain mounted on a double helix and carrying bearing plates or pallets for workpieces. The apparatus put into practice has a load/unload station on the top run of each helix and the pallets are supported at one side by the chain and at the other side on a guideway. In practice objects are thrown off the pallet when the chain goes round a bend, for example when reversing its direction around a sprocket, due to centrifugal force, and also the location of the load/unload stations is not convenient for robot machines.

It is an object of the present invention to provide a transportable storage magazine in the form of a conveyor which may be loaded with workpieces and then presented to machines for successive operations to be carried out on the loaded workpieces.

A first aspect of the invention provide a storage conveyer comprising a housing within which an endless chain conveyor having a series of support means for workpieces or the like to be stored is wound in a double helix configuration so that the support means are carried seriatim through at least two load/unload locations in the housing, wherein the conveyor is provided with a stepwise drive to provide a dwell period at the load-/unload locations, the drive is automatically controllable from outside the housing, and the housing is transportable so as to be moved into proximity with machines to operate on the stored workpieces, and at least one of the load and/or unload locations is positioned below the topmost run of a said helix.

In a preferred arrangement a first load location is positioned in a top run of a helix so as to provide simple and safe access for a manual worker. The support means are stepped through the first location, which may provide access to several support means at a time, under the control of a manual worker who places workpieces on the support means.

The loaded conveyer is then transported to a fixed location adjacent a robot machine which can automatically remove workpieces from the second, lower unload/load location, work on the workpiece and then replace it, the storage means then stepping on one position to place the next workpiece in position for the robot. By providing a second, lower unload/load location the storage conveyor is readily usable by the majority of industrial robots. For those requiring a higher location the storage conveyor may be located on a raised platform.

A batch of workpieces may thus be loaded on a conveyer and the integrity of a batch maintained during transport and work operations at a plurality of locations.

Transportability is preferably provided by the use of a dedicated transporter which complements the storage magazine and may provide a height adjustment feature, e.g of up to 800 mm, for accurate presentation of the workpieces to the machines.

It is envisaged that the storage magazine may have a capacity for 250–500 workpieces, each located on an individual pallet or support means, and that the total floor space occupied by the magazine may be in the region of 2 square meters.

The lower load/unload location is preferably arranged in an extension of a turn of a helix so as to project out from the casing.

Preferably the helices are each supported on a pair of generally upright shafts each carrying a number of sprockets to form several levels for the helices. Preferably one run of the chain is horizontal, preferably the outside run, the chain descending to a lower sprocket (or ascending) on the inside run. The shafts are preferably angled at between 2° and 5° to the vertical with a 1° tolerance, the sprockets being perpendicular to the shafts. The sprockets are thus angled to the horizontal to receive a descending or ascending chain run and deliver it to a horizontal run or vice versa. Preferably the sprockets split the angle between the horizontal and sloping runs, preferably into equal parts.

Preferably the majority of the sprockets run freely on their supporting shafts. This allows for fluctuations in tension along the chain. A degree of friction between the shafts and sprockets may be provided to supply drive to the sprockets whilst allowing for relative sprocket/shaft movement in response to changes in chain tension. A single sprocket on each helix may be fixed to its supporting shaft, the two respective shafts then being driven by a chain and sprocket connection to an an electric motor.

The lower load/unload station is preferably formed by locating a sprocket away from a shaft. The sprocket is horizontal to facilitate handling of workpieces on pallets at the station. This will result in an increased chain run at this level, which will reduce the clearance from the lower level. Preferably the chain ascends to the station or descends from it and a support guide is provided to maintain the chain horizontal from the region of the shaft to the station sprocket, thus keeping the chain substantially parallel to the vertically adjacent runs.

Since the chain enters and leaves a sprocket in different planes it has been found preferable to increase the taper of the sprocket teeth and to taper the sprocket edge inside of the teeth to enhance the take up and pay out of the chain, otherwise the chain may be thrown from the sprocket.

It is also preferred that the housing is provided with means for accurately locating it in relation to the said machines. The said locating means may comprise tapered hollow lower ends in support legs to provide lead-in surfaces onto pre-located plugs secured to a floor surface. The plugs may fit with some interference into the said hollow ends so as to be transportable with the storage magazine for initial location.

The chain conveyor is conveniently associated with static rail means to support the support means. Very preferably, the support means straddle the chain and are supported on a pair of rails at any location when travelling between ends of the helix, being supported on a sprocket and a single outer rail when the direction of travel is reversed around a sprocket. By straddling the chain, a higher linear speed or workpiece weight can be used without throwing the workpieces from the pallets and the pallets can be supported at both sides intermediate the sprockets, to reduce bounce between sprockets.

In another aspect the invention provides a storage conveyer comprising a housing within which an endless chain or belt is wound in a double helix configuration, each helix being wound on a pair of spaced apart shafts, a series of support means being carried by the chain or belt, each being arranged to support and carry a workpiece, wherein means is provided for driving the chain or belt stepwise to provide a dwell period for each support means at a load/unload location, said load/unload location being positioned below the topmost run of the chain or belt and projecting outside of its adjacent helix.

By providing a load/unload location at a low position outside of a helix ready access may be provided for robot machines or the like.

In yet another aspect, the invention provides a method of handling workpieces, comprising loading the workpieces onto a storage conveyor comprising respective support means carried by a chain or belt wound in a double helix configuration, the support means being stepped through at least one load/unload location, the conveyor having a plurality of supporting feet, transporting the storage conveyer to a predetermined location adjacent to a robot machine whereat there are located a plurality of receiving members for cooperating with the feet of the conveyor to locate positively the conveyor, and stepping the support means through the load/unload location with a dwell period to allow workpieces to be removed, worked on by the robot then replaced on the or a different support means.

In yet another aspect the invention provides a storage conveyor comprising a chain or belt wound in a double helix configuration and carrying a plurality of support means for workpieces, the support means being stepped through at least one load/unload location, wherein the support means are connected to the belt or chain intermediate sides of the support means.

By connecting the chain intermediate the sides of the support means, it is possible to provide a fast chain speed, for transporting the support means towards and away from the load/unload location, whilst ensuring that workpieces are not thrown from the support means as the chain direction is reversed when travelling around the helix.

The invention will be further described with reference to the accompanying diagrammatic drawings, in which:

FIG. 4 is an elevation illustrating one form of support means;

FIG. 5 is a plan view of the support means of FIG. 4;

FIG. 6 is a detailed view taken from FIG. 1 and showing the orientation of the shafts of a helix from the inside run;

Figure 1:
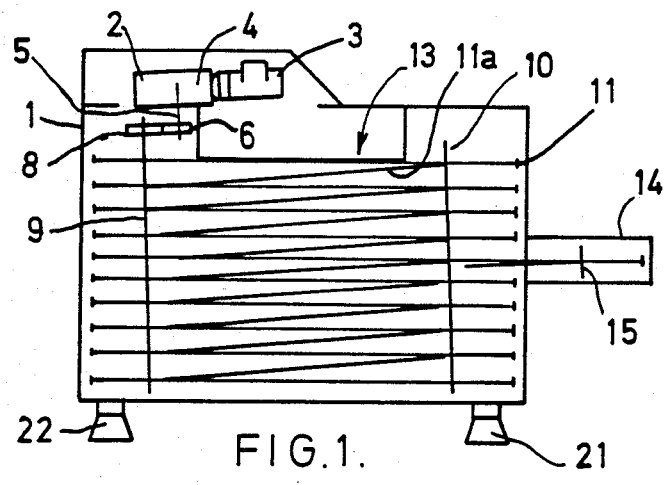
FIG. 1 is a diagrammatic elevational side view showing the position of a chain conveyor in a housing.
Figure 2:
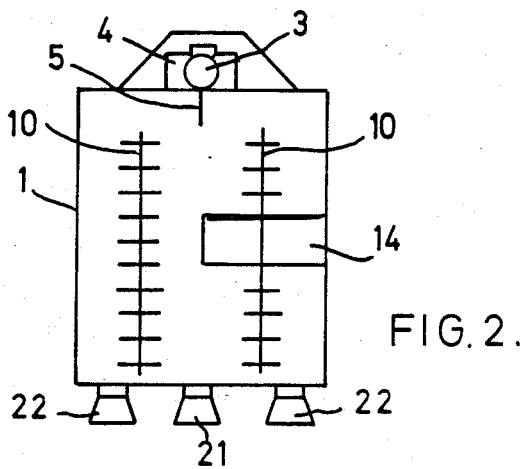
FIG. 2 is an end elevation of the housing of FIG. 1.
Figure 3:
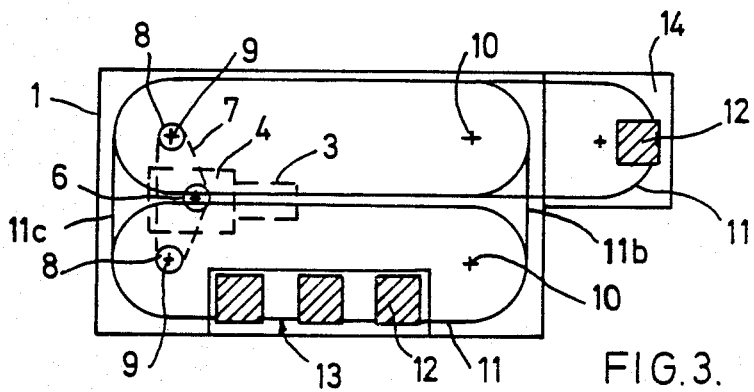
FIG. 3 is a plan view of the housing of FIGS. 1 and 2.

Turning first to FIGS. 1 to 3, a housing is illustrated at 1 and is shown as including a drive assembly 2 including a motor 3 and a reduction gear box 4 having an output shaft 5 driving a sprocket 6. The sprocket 6 drives a chain 7 entraining a pair of sprockets 8 each driving a conveyor drive shaft 9. Each drive shaft 9 has an associated idler shaft 10. The shafts 9 and 10 are mounted in the housing by means of bearings which are not shown. The shafts 9 and 10 also carry sprockets on which there is mounted an endless conveyor chain 11. This carries pallets or other supports 12 for components to be stored within the housing 1.

The top sprocket of one drive shaft 9 is fast with the shaft and the bottom sprocket of the other drive shaft 9 is also fast therewith. The remaining sprockets on the shafts 9, 10 are rotatable to allow for variations in tension along the chain 11.

The shafts 9,10 are angled at between 2° and 5° to the vertical with a 1° tolerance. In the illustrated embodiment each shaft and its associated idler shaft are 1420 mm apart, with the pairs of drive shafts and idler shafts being 535 mm apart. The sprockets are spaced at 115 mm intervals to give a drop of 115 mm on a descending run. The sprockets are 235 mm outside diameter.

Figure 7:
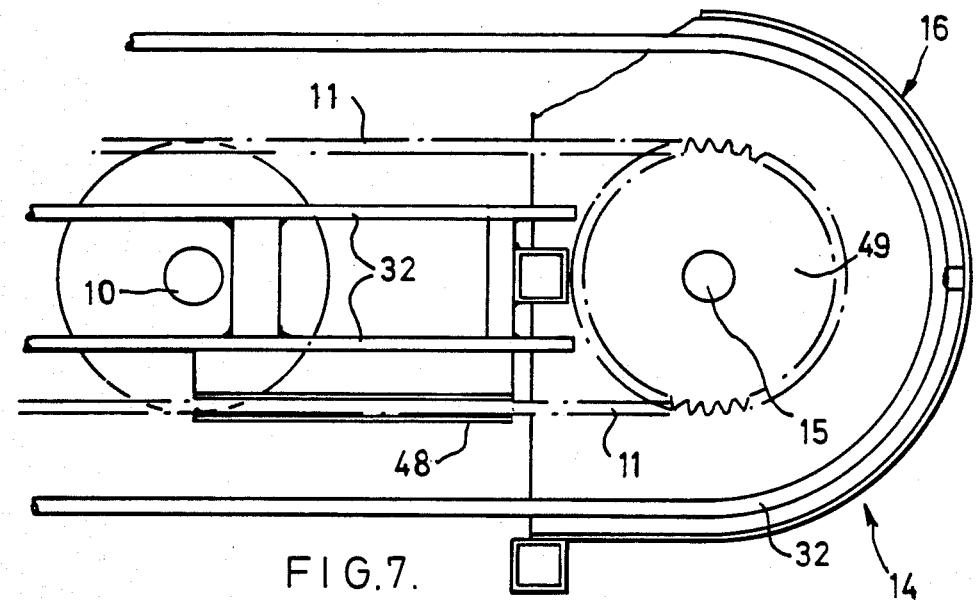
FIG. 7 is a plan view of an intermediate load/unload station.

An opening in the housing provides a station 13 for loading and unloading components or workpieces from the pallets 12 on a top run of a helix, and an extension 14 to the housing 1 projects from the housing 1 at a lower point and has an open top so as to provide access to the chain 11, thereby forming a second load/unload station (see FIG. 7).

The endless chain 11 is wound on the sprockets so that, starting from the load/unload station 13 which is at the top of one elongate helix provided by the sprockets on the shafts 9 and 10, the chain passes round the uppermost sprocket on the shaft 10 and then descends one level as indicated by the run 11a to pass round the second sprocket on the shaft 9 on its own side of the housing 1. The chain then continues successively in this manner until it reaches the lowermost of the sprockets on the shaft 9, whence it passes over the lowermost sprocket on the shaft 10 and along a run 11b so as to pass into the other helix onto the sprocket 40, whence it starts to climb in similar manner through the sprockets 41,42,43 . . . 44,45,46 until it reaches the uppermost sprocket 47 on the drive shaft 9 (see FIG. 6), whence it passes back via a run 11c to the uppermost layer on the first or front helix.

At an intermediate level on the rear helix which is illustrated in FIG. 6, there is provided a vertical idling shaft 15, mounted in the extension 14, and the chain is passed round a sprocket mounted horizontally on this so as to enter the extension 14 where it is exposed so that components may be removed from pallets when in the position illustrated in FIG. 3. A sprocket is not provided on the shaft 10 at this level. A chain guide 48 supporting the chain is provided to extend horizontally from inline with the shaft 10 towards the sprocket 49 so that the chain in the ascending run is parallel to the chain in the ascending runs above and below.

By providing closely spaced pallets 12 along the chain 11, and supporting these, as will be described hereinafter in more detail, the housing 1 may be made to accommodate a large number, e.g. 250 to 500, of components or workpieces to be presented serially at the loading/unloading station provided by the extension 14.

It will be understood that in use, components will be loaded one at a time via the load/unload station 13, and the conveyor will be stepped on one position at a time on each loading, either manually or automatically, and this process will continue either until enough components have been loaded, or until the storage magazine is full with every pallet occupied. Alternatively, the conveyor may be run continuously during this loading at a speed suitable for manual loading.

The loaded conveyor will then be taken to a machine to which the workpieces have to be fed one at a time for the manufacturing step to be carried out. For this purpose, the machine will be arranged so as to be properly aligned with the automatic load/unload device on the machine which will collect the components one at a time from the projecting extension 14. It will normally take a component which is presented to it, work on it, replace it on its own pallet 12 and then by means of a control on the machine itself, will cause the conveyor to step round one place, or until a loaded pallet is presented, when it will repeat the operation. The workpieces may be replaced on the pallets in different positions from that from which they were taken so that the machine can automatically sense when it has completed work on all the loaded components.

The housing may then be detached from that particular machine and moved to the next manufacturing stage, and a fresh housing 1 with more components may be brought up if required. In this manner, the components only have to be loaded into the housing once, and may then be taken serially to the various manufacturing operations, before the finished components are unloaded.

It will be understood that with a capacity of some 250 workpieces, a line of machines taking on average about one minute for each operation can be loaded with four hours work at one operation. Thus, as soon as the last machine in the maanufacturing chain has finished, the finished components may be removed from that machine and it will be ready to receive the components from the penultimate machine.

Once every machine is operating,the final components may be unloaded from the magazine and fresh workpieces loaded into it in time for the next commencement.

The housings may be provided with retractable transport wheels, or they may be moved on fork lift or other trucks, e.g. collapsible trolleys.

However, it is preferred that a dedicated or specialised transporter be used. Such a transporter may include a height adjustment for the magazine, e.g. with an adjustment range of 800 mm.

Figure 13:
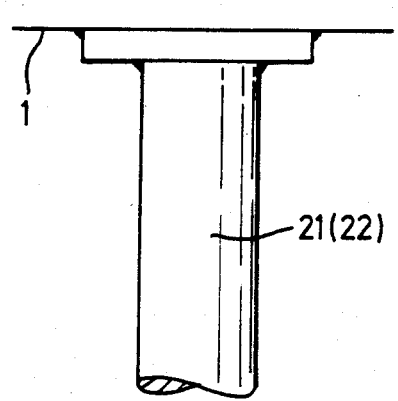
FIG. 13 shows a detail of a supporting foot.

It is to be noted that the housing is provided with support legs 21 and 22, which are preferably 3 in number, and that the support legs have a conical recess in their lower ends (see FIG. 13). This means that the support legs may be located over tapered blocks or plugs 50 secured to the floor 51 so as to provide accurate location of the extension 14 in relation to the robot machine which is assumed to be fixed to the floor. The plugs 50 are each screwed into a socket 52 bolted to the floor 51, the screw connection allowing independent adjustment of the plug heights at each location for the machine.

For initial setting up at a work station, the plugs over which the legs 21,22 fit may be inserted, with interference, in the tapered portions of the legs 21,22 and the magazine then aligned accurately with the machine. The plugs or blocks may then be bolted to the floor so as to ensure that the position of the magazine is reproduced accurately for subsequent operations.

Turning now to FIGS. 4 and 5, this shows one form of pallet or support means attached to a link 31 of the chain 11. In this arrangement, the pallet is supported on a pair of support rails 32 located one each side of the chain 11. The pallet itself consists of a base portion 33 which has a pair of downturned cheeks 34 straddling an extension 35 of the link 31 so as to locate the pallet and enable it to be driven by the chain. A security screw is shown at 36. The extension 35 is securely attached to the chain 11 and loosely attached to the base portion 33. The cheeks 34 transmit drive from the chain link extension to the pallet, whilst allowing the chain to flex and oscillate. Guides 38 attached to the pallet base 33 rest against the side of the chain 8 to reduce snaking of the chain or pallet.

The pallet rests on guide rails 32 which are aligned between sprocket centres, above the height of the chain on its run between sprockets, but the outer rail is position at the sprocket height adjacent the sprocket, the inner edge of a pallet resting on the sprocket as the pallet is driven therearound. The guide rails are curved downwardly when approaching a lower sprocket edge.

Also shown in FIG. 5 is a sensing peg 37a fixed on the lower portion 33 of the pallet adjacent the chain 11, peg 33 is sensed by a sensor (not shown) positioned adjacent the edge of the sprocket 49 (FIG. 7) so as to send a control signal back to the drive mechanism control to enable accurate arrest of the pallets.

A second peg 37b is removably affixed to the pallet and may be used to indicate the start or finish of a batch, this peg 37b is sensed by a sensor 59.

A further boss or peg 38 is shown to prevent slewing of the pallet in relation to the rail 32.

The pallet is further shown as having a pair of support pillars 39 and an actual support surface 41 for the workpieces to be carried. The details of support mechanism for the workpieces are not shown, since these will be chosen for the components concerned. Preferably a contoured surface is provided on which the pieces may rest. For this purpose, the support surface may be readily replaceable on the pillars 39 to enable the magazine to be readily adapted for different types of component.

Figure 8:
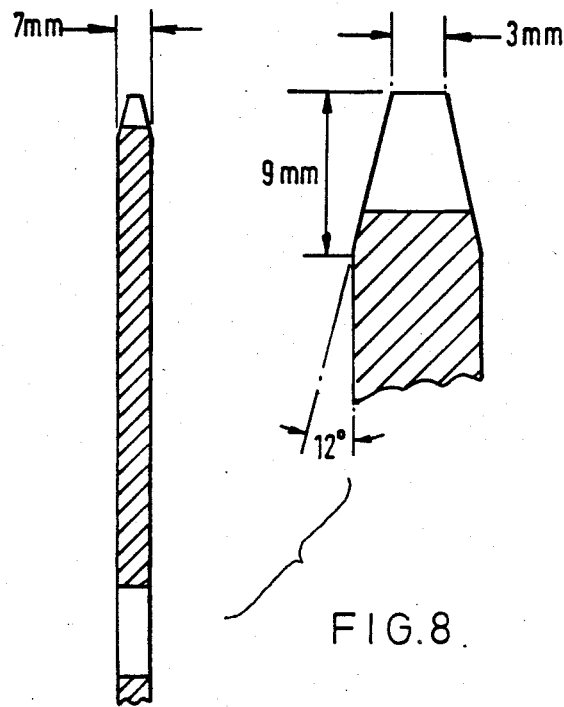
FIG. 8 shows a sprocket.

FIG. 8 shows a sprocket detail. The sprocket of the embodiment is of 9¼ inch outside diameter having teeth with ½ inch pitch, to match a ½ inch chain. The teeth are tapered on each face at 12° to the plane of the sprocket, down to 3 mm at their outer edge. The taper extending beyond the teeth to the spocket body which is 9 mm thick.

It will be seen that the pallets 44 are simple to replace, and again no description is given of the arrangements on them for supporting particular workpieces.

Figure 9:
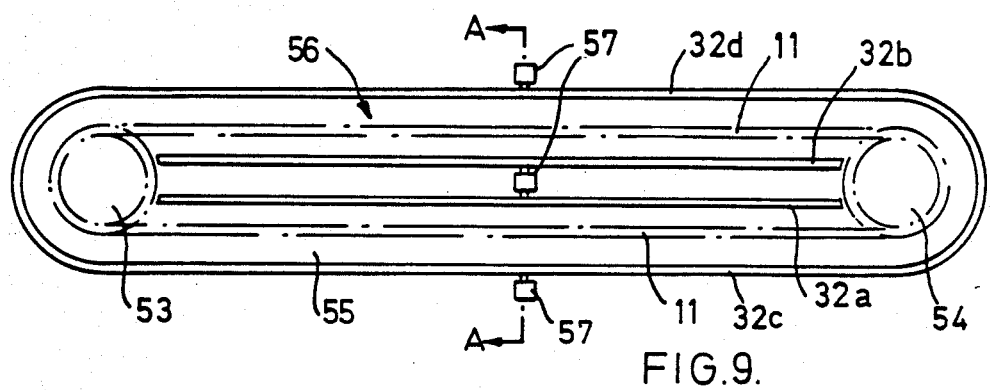
FIG. 9 shows a plan view of a turn of the helix.
Figure 10:
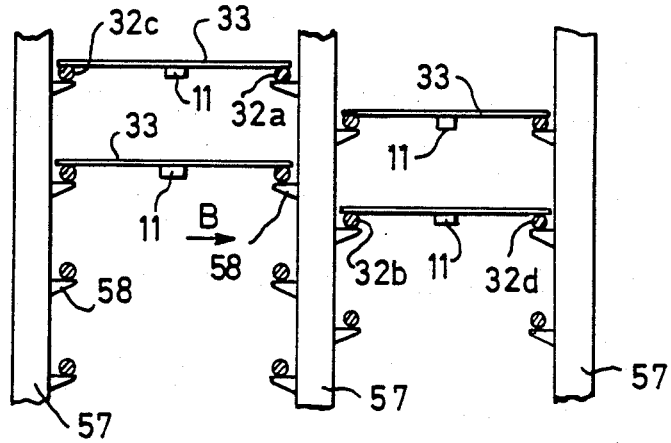
FIG. 10 shows a section on line A—A of FIG. 9.
Figure 11:
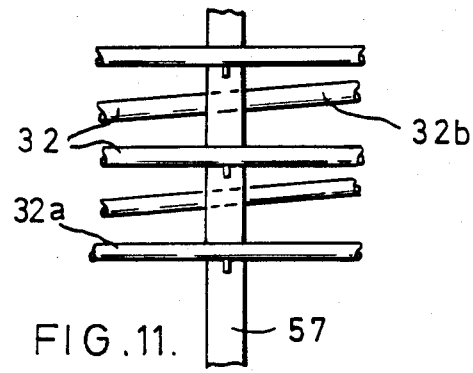
FIG. 11 shows a view on arrow B of FIG. 10.
Figure 12:
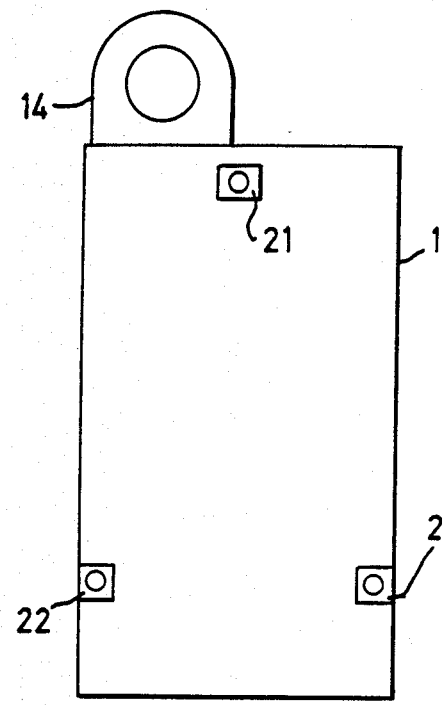
FIG. 12 shows an underneath view showing a preferred location for supporting feet.

FIGS. 9, 10 and 11 illustrate the arrangement of the chain 11 and supporting rails 32 intermediate the end sprockets on the front helix seen in FIG. 1.

FIG. 9 is a plan view and shows end sprockets 53, 54. The chain 11 runs horizontally from sprockets 53 to 54 on the outer run 55, descending or ascending on the inner run 56. Inner support rails 32 a,b,c,d are secured to uprights 57 of the housing 1 on lugs 58.

Various modifications may be made within the scope of the invention.

We claim:

1. A storage conveyor comprising a housing with walled sides within which an endless conveyor means is wound in a double helix configuration, said conveyor means carrying a series of support means for workpieces, in which said conveyor means is drivable to step said support means to descend one helical path and climb the other helical path, said housing further comprising a lateral extension housing with walled sides mounted approximately half way up a first side of said housing and having an open top, an extension of one of said helixes mounted to move through said lateral extension and to carry said support means in turn therethrough such that each support means may be loaded or unloaded from above said lateral extension through said open top during operation of said conveyor.

2. A storage conveyor as claimed in claim 1, wherein a second load/unload location is provided on a top run of said helix.

3. A storage conveyor as claimed in claim 1, wherein said support means comprise pallets which are attached to said conveyor means midway between sides of said pallets, said pallets resting at said sides on guide rails.

4. A storage conveyor as claimed in claim 3, wherein a first pallet is loosely attached to said conveyor means to allow vertical and horizontal play between said first pallet and said conveyor means, stops being provided to limit horizontal swivelling movement between said first pallet and conveyor means.

5. A storage conveyor as claimed in claim 1, further comprising a plurality of supporting feet provided on said conveyor and location means provided at a predetermined on the floor location to receive said supporting feet thereby accurately locating said housing relative to said floor.

6. A storage conveyor as claimed in claim 1, wherein each said helix is supported on a respective pair of shafts, each said shaft carrying a plurality of sprockets for supporting said conveyor means, wherein a first shaft is driven, a single sprocket on each said driven shaft being fast with said shaft, and the remaining sprockets being a friction fit on said shafts at predetermined heights to allow relative rotation between said sprockets and shafts in response to variations in tension in said conveyor means.

7. A storage conveyor as claimed in claim 6, wherein said shafts are parallel and angled to the vertical by from 1° to 5°.

* * * * *